Figure 3:
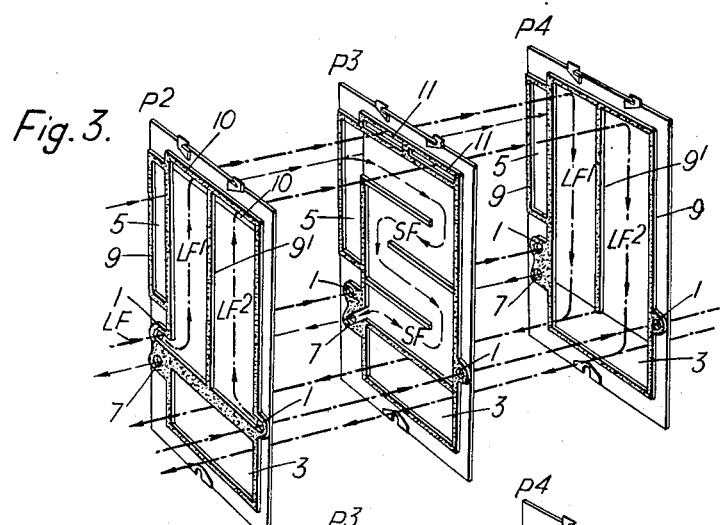

Nov. 15, 1960     H. F. GOODMAN     2,960,160
EVAPORATORS
Filed March 20, 1957     3 Sheets-Sheet 1
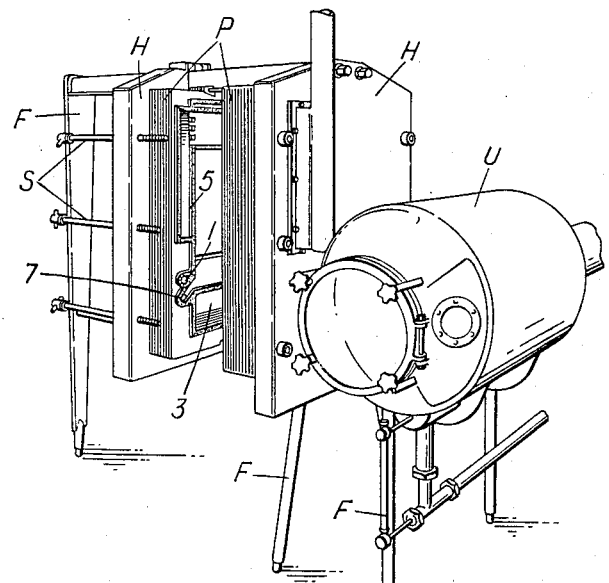
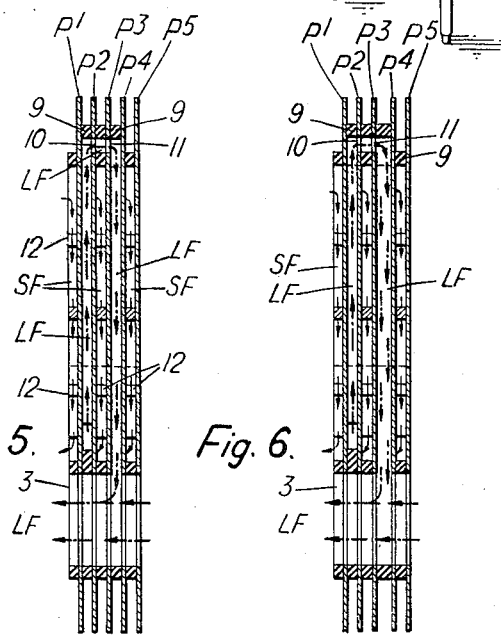
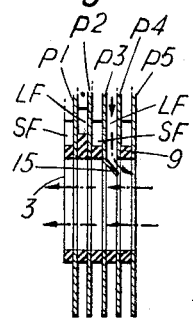
Inventor:
Hugh Frederick Goodman
By: Baldwin & Wight
Attorneys

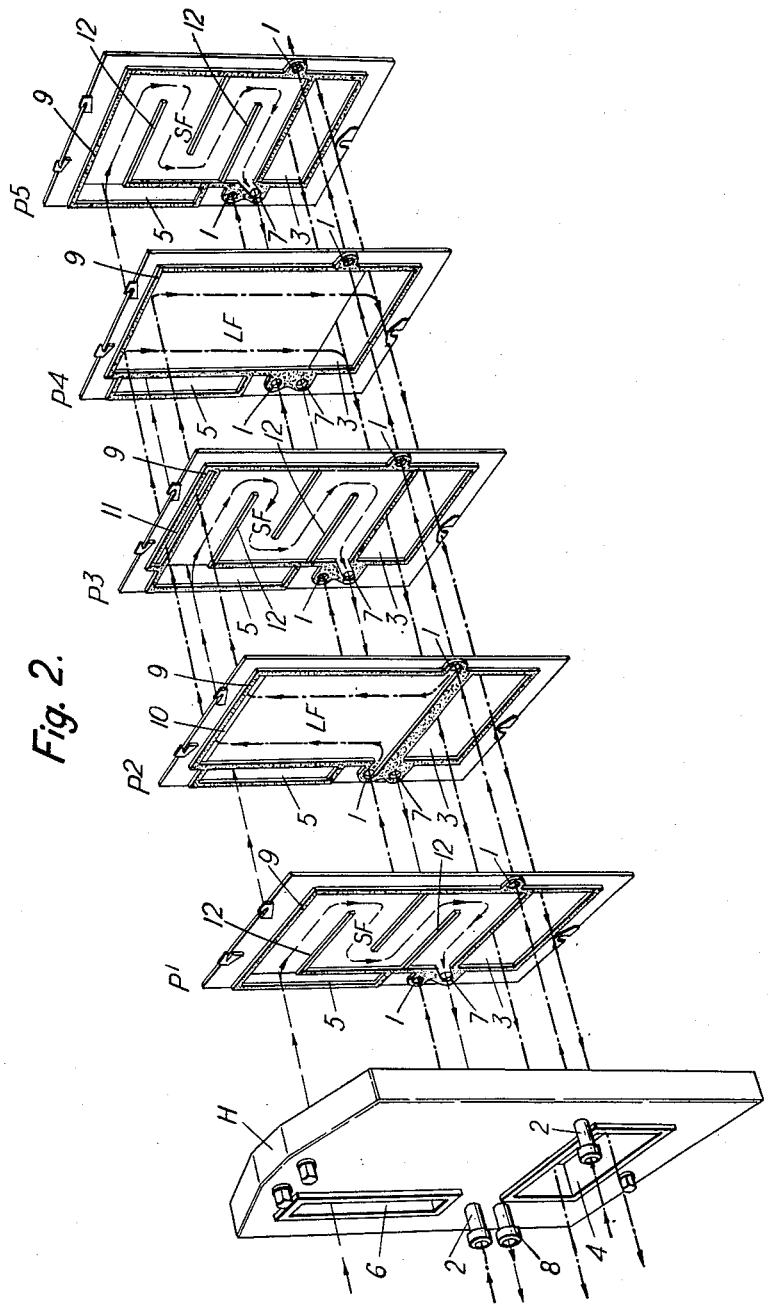

Inventor:
Hugh Frederick Goodman
By: Baldwin & Wight
Attorneys

United States Patent Office 2,960,160
Patented Nov. 15, 1960

2,960,160

EVAPORATORS

Hugh Frederick Goodman, Wimbledon, London, England, assignor to The A.P.V. Company Limited, Manor Royal, Crowley, England Filed Mar. 20, 1957, Ser. No. 647,380

Claims priority, application Great Britain Mar. 21, 1956

6 Claims. (Cl. 159—13)

This invention relates to evaporators such as are employed for the concentration of liquid products.

An evaporator according to this invention comprises an assemblage of plates in spaced relationship to provide flow channels at least one of which (termed a heating channel) is connected to an inlet and an outlet for a heating medium and at least two others of which (termed liquid channels) are connected at corresponding ends across an intermediate heating channel and at their other ends respectively to an inlet for the liquid to be evaporated and an outlet for the concentrated liquid.

Usually a number of heating channels and a number of sets of liquid channels connected in the manner referred to would be provided in a single assemblage of plates constituting an evaporator, the heating channels and the sets of liquid channels being arranged in parallel with one another across inlet and outlet lines for the heating medium and the liquid and its concentrate.

With this arrangement, the connected liquid channels provide a total length of flow path which can be accommodated more conveniently and compactly than would be possible with a single flow passage of equivalent length, the liquid moving in one direction in one of the connected liquid channels and then in the other direction in the other connected channel.

It would in general be usual for the plate to be more or less vertical with the additional advantage that the connections can be arranged to cause the liquid to have a rising flow in one of the connected liquid channels and a falling flow in the other: this enables an even distribution of the supply of liquid to the connected liquid channels to be effected easily: when the falling flow is passing to the outlet, high concentration in the product is promoted. In addition, an evaporator according to this invention is well adapted to operate on the principal generally known as "film" evaporation in which the liquid to be concentrated passes once through the evaporator so that its actual time of subjection to heating is low: this results in improvement in the quality of the final product: such film evaporators are recognised as being sensitive to control, and to ensure uniform distribution through a number of surfaces in parallel is difficult, but the arrangement of the invention enables these difficulties to be overcome by virtue of the rising and falling flow and the ability to vary the cross-sectional area of the liquid channels in the direction of flow to suit requirements.

This variation of the cross-sectional area can be obtained in a number of ways. Thus, the gap between or the form of the plates providing the liquid flow channels may be arranged to give channels of different cross-sectional area regarded in the direction of flow. For example, the gap and/or the width of the channels for the falling flow can be smaller or larger than for the rising flow channels as may be found necessary to suit conditions. Moreover, each liquid passage may have in its own length variation in its cross-sectional area, such variation being obtained by variation in the gap and/or by variation in the width of the channel.

It would also be possible to constitute one or both of the connected liquid channels by the gaps between a number of plates so that the channels are in effect constituted by the sum of two or more branches in parallel. This arrangement lends itself to providing one connected liquid channel with a different cross-section from that of the other by selection of the number of plates to provide the one channel as compared with the other.

Moreover, each flow channel can extend across the entire width of the plates or provision can be made to subdivide the width of the plates into a number of (say two) liquid flow channels extending side-by-side. These subdivided flow channels can be of similar width throughout their length but they can be of a varying width, i.e. tapered to give the varying cross-sectional area referred to.

Figure 4:
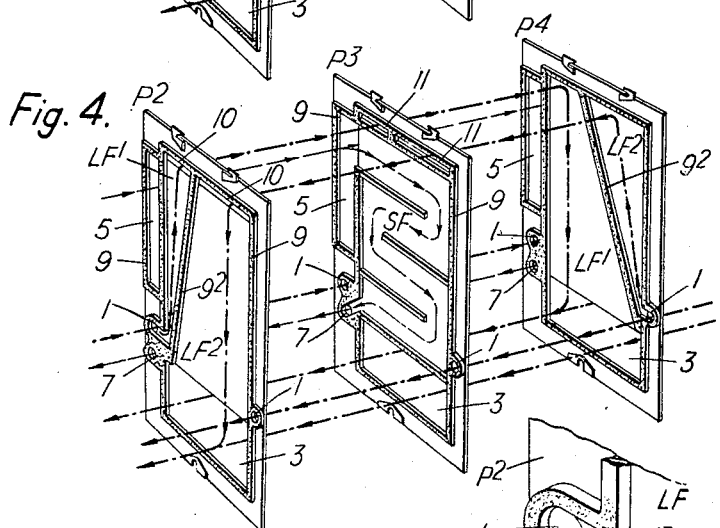
Figure 8:
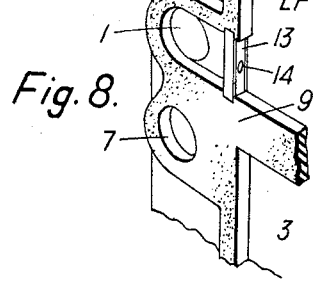

The invention is illustrated in the accompanying drawings in which Figure 1 is a perspective view of an evaporator installation in an opened position, Figure 2 is an exploded perspective view showing the various plates separated, Figures 3 and 4 are views similar to Figure 2 but showing plates of a modified form, Figures 5 and 6 are vertical sections through two arrangements of an assemblage of plates, Figure 7 is a local vertical section, and Figure 8 is a local perspective view of a metering device.

Referring to the drawings and considering firstly Figure 1, the evaporator comprises an assemblage of plates P which are disposed face-to-face and are clamped between pressure heads H which can be drawn together by screws S, the heads and the plates being held in a frame F which also supports at one end a separator unit U to separate vapours from the treated evaporated liquid.

Referring now to Figure 2, this figure shows a number of plates forming a single effect for the liquid to be concentrated, the various plates being indicated by the references $P^1$, $P^2$, $P^3$, $P^4$ and $P^5$.

All of the plates are formed with openings which, when the plates are pressed face-to-face with one another, register with one another and with openings in the head H as shown. These openings provide inlet passages for the liquid to be evaporated and outlet passages for the concentrated product, and passages for the inlet and outlet of a heating fluid (or its condensate) which in most cases would be steam.

Thus, each plate has two openings 1 and the various openings register to provide inlet passages for the liquid to be evaporated, the openings 1 in the end plate $P^1$ registering with supply ducts 2 in the head H. The aligned openings 1 provide fluid inlets passing straight through the plates. Each plate has also an opening 3 and the various openings 3 register to provide an outlet trunk passage for the concentrated liquid, and the liberated vapour, the outlet for the fluid passing straight through the plates and registering with an outlet opening 4 in the head H.

In addition, each plate has an opening 5 and the various openings register to provide a supply trunk for a heating medium which would normally be steam which registers with a supply opening 6 in the head H: each plate also has an opening 7 and the various openings register to provide an outlet duct for the heating medium or its condensate, the duct registering with an outlet duct 8 in the head H. The heating medium inlet and outlet also pass straight through the plates.

Thus, when the plates are pressed together with gaskets 9 interposed between them, the various openings provide parallel passages for the liquid to be treated which is supplied by the two ducts 2 and returns as a concentrated product via the trunk openings 3 and for the steam which is supplied by the trunk openings 6 and returns as a condensate via the openings 7. The liquid flow is indicated by dot and peck lines in Figure 2 and the steam flow by dashed lines.

Now for the purpose of this invention, certain of the plates, i.e. the plates $P^2$, $P^4$, for convenience termed primary plates, cooperate with adjacent plates $P^1$, $P^3$ and $P^5$, for convenience termed secondary plates, to provide liquid flow channel components LF which are spaced apart and the plates $P^1$, $P^3$ and $P^5$ cooperate with the head H and with the plates $P^2$, $P^4$ to provide steam flow channel components SF which are disposed at each side of and between the liquid flow channels. These liquid and steam flow channels are defined by the gaskets 9 which are disposed between the adjacent faces of the adjacent pairs of plates. In the case of the plate $P^2$, its gasket is shaped to connect the base of the liquid flow space LF of that plate to the openings 1 so establishing a connection to the liquid inlet duct formed by the registered openings 2: this plate at its upper end is formed with a transfer opening 10 which registers with a transfer opening 11 at the upper end of the plate $P^3$ and this opening in its turn registers with the upper end of the plate $P^4$ within its gasket 9. This plate $P^4$ has the opening 3 formed at its lower end.

The openings 10 and 11 interconnect one, the upper, set of closely adjacent ends of the liquid flow channels LF and LF provided respectively between the plates $P^2$ and $P^4$ and the intervening heating channel SF, the interconnection being across the heating channel SF. The other (lower) ends of these two liquid flow channels LF are connected respectively to the inlet 1 for liquid to be concentrated and to the outlet 3 for concentrated liquid. Thus the liquid flow is from the two inlet or supply ducts formed by the registered openings 1 up the plate $P^2$, across the top of the plate $P^3$ and down the plate $P^4$ to the outlet duct formed by the registered openings 3.

In the case of the plates $P^1$, $P^3$, $P^5$, the steam passes from the inlet or supply duct formed by the registered openings 5 at the side, down the plates to the condensate outlet passage formed by the registered openings 7: as is shown, these plates are fitted or formed with baffle strips 12 to compel the steam to follow a tortuous path.

The actual formation of the flow paths can best be seen by reference to Figure 5.

In the formation shown in Figure 5, the rising and falling channels LF have the same cross-sectional area and both have a width approximating to the width of the plates.

Figure 7 shows a liquid flow deflector at the bottom of the rightmost or downflow channel LF.

This invention lends itself to varying the cross-sectional area in the direction of flow of the liquid. For example, the arrangement shown in Figure 6 can be adopted to give an increasing cross-section to the falling flow as it passes to the return opening 3: in this case the falling flow gap between the plates $P^3$, $P^4$ is made greater than the rising flow gap between the plates $P^1$, $P^2$.

In the arrangement shown in Figure 2, a single composite liquid flow path or channel is provided between the four plates $P^1$—$P^4$ which form a set: it is however possible to divide the plates by suitable shaping of the gaskets 9 to provide two or more liquid flow channels LF side by side. Thus, in Figure 3 two flow channels $LF^1$ and $LF^2$ are provided by the expedient of forming the gaskets 9 with a dividing strip $9^1$, the two halves of the liquid flow channels taking their supply from the passages formed by registered openings 1 at opposite sides of the plate, and the two channels both discharging to the trunk formed by the registered openings 3.

In Figure 3 the two side-by-side channels have the same width throughout their length: to give a varying cross-section they can have different depth as in the arrangement shown in Figure 6. Alternatively or in addition, they can have a varying width as is shown in Figure 4 and to enable the width of the plates to be used to advantage, the one flow channel is laid with its increasing width against the decreasing width of the other, this being achieved by forming the gaskets 9 of the plates $P^2$, $P^3$ and $P^4$ with a sloping partition rib $9^2$. In such a case the inlet to one channel $LF^1$ would be taken as shown from one supply passage formed by the registered openings 1 so as to pass in one direction through that channel while the supply to the other channel $LF^2$ would be taken from the other supply line formed by the other set of registered openings 1 so as to pass through that channel in the opposite direction.

It will be obvious that the number of sets of plates can be increased within the limits of the frame F of the machine: in this way common supply and return ducts for the liquid and the steam are provided by the various registered openings 1, 3, 5 and 7 and the liquid and steam flow channels formed by the different sets of plates are effectively in parallel across those ducts.

It will also now be clear how either or both the rising and falling liquid flow channels LF can be formed by the gaps between more than one pair of plates: thus, referring to Figure 5, two plates $P^2$ could be employed to provide two parallel branches to the rising channel LF and three plates $P^4$ could be employed to provide three parallel branches to the falling flow channel LF, so providing a greater cross-sectional area (as in Figure 6) for the falling flow.

In some cases, particularly when a high degree of concentration is required, it may be desirable to fit at each entry feed port for each set of plates a metering device: such a device is shown in Figure 8 as consisting of an insert 13 having a metering orifice 14, this insert being fitted to the gasket 9 of a plate where the gasket is cut away to connect the liquid flow channel LF to the common supply duct 1. This device operates to ensure an even distribution of the liquid flow over the different sets of plates, all of which take their supply from the same supply duct.

The evaporator shown gives a single effect: as will be well understood by those versed in the art, units such as described can be combined to form a multiple effect evaporator, the vapour formed in one effect after separation from the partially concentrated liquid being taken to the heating passages of other effects whereby economy in heating is made possible: other expedients such as forward or reverse feed can also be used and where desirable a proportion of the concentrated product can be recirculated with the feed.

What I claim is:

1. A multiple plate evaporator comprising a plurality of alternately arranged primary and secondary plates; registering liquid inlet openings extending through said plates; registering liquid outlet openings extending through said plates; registering heating medium inlet openings extending through said plates; registering heating medium outlet openings extending through said plates, at least one of said primary plates and a first secondary plate on one side thereof having registering liquid transfer openings extending therethrough remote from the associated liquid inlet openings; a heating medium flow-channel defining gasket between said one of said primary plates and said first secondary plate on said one side thereof surrounding said liquid inlet and outlet openings separately for confining liquid to flow therethrough without flowing over an extensive area of the facing surfaces of said last mentioned plates, said gasket delineating a heating medium flow channel extending over an extensive area of the surface of said first secondary plate facing said primary plate and embracing said heating medium inlet and outlet openings; and a liquid flow channel defining gasket between said one of said primary plates and a second secondary plate on the opposite side thereof from said first secondary plate and surrounding said heating medium inlet and outlet openings and said liquid outlet opening separately for confining heating medium and exiting liquid to flow respectively therethrough without spreading therefrom over an extensive area of the surface of said second secondary plate facing said primary plate, said liquid flow channel defining gasket delineating a liquid flow channel extending over an extensive area of the surface of said one of said primary plates facing said second secondary plate and embracing the liquid inlet opening and the liquid transfer opening in said one of said primary plates to permit such spreading.

2. A multiple plate evaporator according to claim 1 in which there is interposed between said first secondary plate on said one side of said one of said primary plates and another primary plate on the remote side of said first secondary plate a further liquid flow channel defining gasket surrounding said heating medium inlet and outlet and said liquid inlet openings separately for confining heating medium and liquid to flow respectively therethrough without spreading therefrom over an extensive area of the facing surfaces of said last mentioned plates, said further liquid flow channel defining gasket delineating a liquid flow channel extending over an extensive area of the facing surfaces of said last mentioned plates and embracing the liquid transfer opening in said first secondary plate and the liquid outlet opening in said other primary plate to permit liquid spreading.

3. A multiple plate evaporator comprising a plurality of plates in face-to-face relation, means forming a heating medium inlet passing straight through said plates, means forming a heating medium outlet passing straight through said plates, means forming an inlet for liquid to be concentrated passing straight through said plates, means forming an outlet for concentrated liquid passing straight through said plates, means serving to space the plates apart and to provide between a first of said plates and a second of said plates, an intermediate heating channel connected to said heating medium inlet and to said heating medium outlet, to also provide between said second of said plates and a third of said plates a liquid flow channel for the liquid to be evaporated, and to also provide between said first of said plates and a fourth of said plates a further liquid flow channel for the liquid to be evaporated, said liquid flow channels respectively being on opposite sides of said second of said plates, means interconnecting one set of closely adjacent ends of said liquid flow channels across said intermediate heating channel, means sealing said liquid flow channels from said intermediate heating channel at said closely adjacent ends, means connecting the other ends of said liquid flow channels respectively to said inlet for the liquid to be concentrated and said outlet for the concentrated liquid, and means sealing said other ends of said liquid flow channels from said heating medium inlet and outlet where they pass straight through said plates.

4. A multiple plate evaporator as claimed in claim 3 and wherein the plates are disposed substantially vertically and said set of closely adjacent liquid flow channel ends is vertically spaced from said other ends thereof, whereby the connected liquid channels compel the liquid to have a rising and a falling flow in passing from said inlet to said outlet.

5. A multiple plate evaporator as claimed in claim 3 and wherein the means interconnecting said one set of closely adjacent ends of liquid flow channels across said intermediate heating channel and sealing said liquid flow channels from said intermediate heating channel at the other ends of said liquid flow channels comprises gaskets disposed between said plates, the form of the gaskets determining the plate separation, the form of the channels, and the connections between the flow channels and the inlet and outlet passages.

6. A multiple plate evaporator as claimed in claim 3 and wherein the connection between one of said liquid flow channels and the outlet for the concentrated liquid is equipped with a deflector.

References Cited in the file of this patent

UNITED STATES PATENTS

| 485,315 | Yaryan | Nov. 1, 1892 |
| 1,770,254 | Seligman | July 8, 1930 |
| 2,229,306 | Prestage | Jan. 21, 1941 |
| 2,428,880 | Kintner | Oct. 14, 1947 |
| 2,562,739 | Risberg | July 31, 1951 |
| 2,623,736 | Hytte | Dec. 30, 1952 |
| 2,624,401 | Schilt | Jan. 6, 1953 |
| 2,742,083 | Henszey | Apr. 17, 1956 |
| 2,781,028 | Armacost | Feb. 12, 1957 |

FOREIGN PATENTS

| 464,004 | Great Britain | Apr. 9, 1937 |